United States Patent
Dawson et al.

[11] Patent Number: 5,984,397
[45] Date of Patent: Nov. 16, 1999

[54] FOLDING SEATING UNIT FOR A VEHICLE

[75] Inventors: Richard Dawson, Nottingham; Christopher J. Goodall, Derby; Danella Louise Bagnall, Coventry; David John Walker, Warwickshire; Matthew Richard Oliver, West Midlands, all of United Kingdom

[73] Assignees: Rover Group Limited, Warwick, United Kingdom; Tricom Automotive Limited, Nottingham, United Kingdom

[21] Appl. No.: 08/849,988

[22] PCT Filed: Dec. 4, 1995

[86] PCT No.: PCT/GB95/02824

§ 371 Date: Aug. 20, 1997

§ 102(e) Date: Aug. 20, 1997

[87] PCT Pub. No.: WO96/17743

PCT Pub. Date: Jun. 13, 1996

[30] Foreign Application Priority Data

Dec. 3, 1994 [GB] United Kingdom .................... 9424484
Jan. 7, 1995 [GB] United Kingdom .................... 9500293

[51] Int. Cl.$^6$ ........................................................ B60N 2/10
[52] U.S. Cl. .................................... 296/65.09; 296/65.11; 297/14; 297/61; 297/284.7
[58] Field of Search ............................... 296/65.09, 65.11; 297/14, 61, 284.7, 378.12

[56] References Cited

U.S. PATENT DOCUMENTS

| | | |
|---|---|---|
| 1,747,717 | 2/1930 | Hummert . |
| 2,116,366 | 5/1938 | Scott . |
| 2,523,960 | 9/1950 | Liljengren et al. . |
| 4,527,828 | 7/1985 | Groce et al. . |
| 4,639,037 | 1/1987 | Maruyama et al. . |
| 4,679,749 | 7/1987 | Ryan et al. . |
| 4,986,591 | 1/1991 | Martienssen et al. . |
| 5,489,141 | 2/1996 | Strausbaugh et al. . |
| 5,492,389 | 2/1996 | McClintock et al. ..................... 297/14 |

FOREIGN PATENT DOCUMENTS

| | | |
|---|---|---|
| 0 110 011 | 6/1984 | European Pat. Off. . |
| 0 320 199 | 6/1989 | European Pat. Off. . |
| 0 402 195 | 10/1990 | European Pat. Off. . |
| 0 518 346 A1 | 12/1992 | European Pat. Off. . |
| 0 572 811 | 12/1993 | European Pat. Off. . |
| 0 592 273 A2 | 4/1994 | European Pat. Off. . |
| 0 631 902 A1 | 1/1995 | European Pat. Off. . |
| 1 056 670 | 3/1954 | France . |
| 2 696 386 | 4/1994 | France . |
| 2 698 327 | 5/1994 | France . |
| 84 24 854 U | 5/1985 | Germany . |
| 93 12 727 | 10/1993 | Germany . |
| 243121 | 11/1925 | United Kingdom . |
| 632481 | 11/1949 | United Kingdom . |
| 1168496 | 10/1969 | United Kingdom . |

(List continued on next page.)

OTHER PUBLICATIONS

Database WPI, Section PQ, Week 7951, Derwent Publications Ltd., London.

*Primary Examiner*—Gary C. Hoge
*Attorney, Agent, or Firm*—Fish & Richardson P.C.

[57] ABSTRACT

A folding seating unit for a vehicle provides a forward or rearward facing seat with a backrest which is capable of being folded flat and sideways against the side of the vehicle at a low level beneath the window level of the vehicle. The seating unit can be stowed within side trim panels without obscuring windows, or the load carrying area of the vehicle floor, and is particularly suited to multipurpose vehicles or vans. The seating unit includes: an outboard leg coupled to the vehicle side, and an inboard leg engaging with the vehicle floor, a retraction mechanism providing automatic folding of the inboard leg when the seating unit is folded to its stowed position; an extending backrest squab which extends the effective height of the backrest when the seating is in a deployed condition, but retracts when the seating is in the stowage position. A more compact stowed seat is achieved, while maintaining a desirable height of seating for neck and head support of an occupant of the seat, thereby reducing risk of injury in accidents, and increasing the range of occupant size for which the seating is suitable.

17 Claims, 10 Drawing Sheets

FOREIGN PATENT DOCUMENTS

| | | |
|---|---|---|
| 1 229 947 | 4/1971 | United Kingdom . |
| 1229947 | 4/1971 | United Kingdom . |
| 2 012 573 | 8/1979 | United Kingdom . |
| 2 141 326 | 12/1984 | United Kingdom . |
| 2 213 368 | 8/1989 | United Kingdom . |
| 2 269 987 | 3/1994 | United Kingdom . |
| WO 94/01302 | 1/1994 | WIPO . |

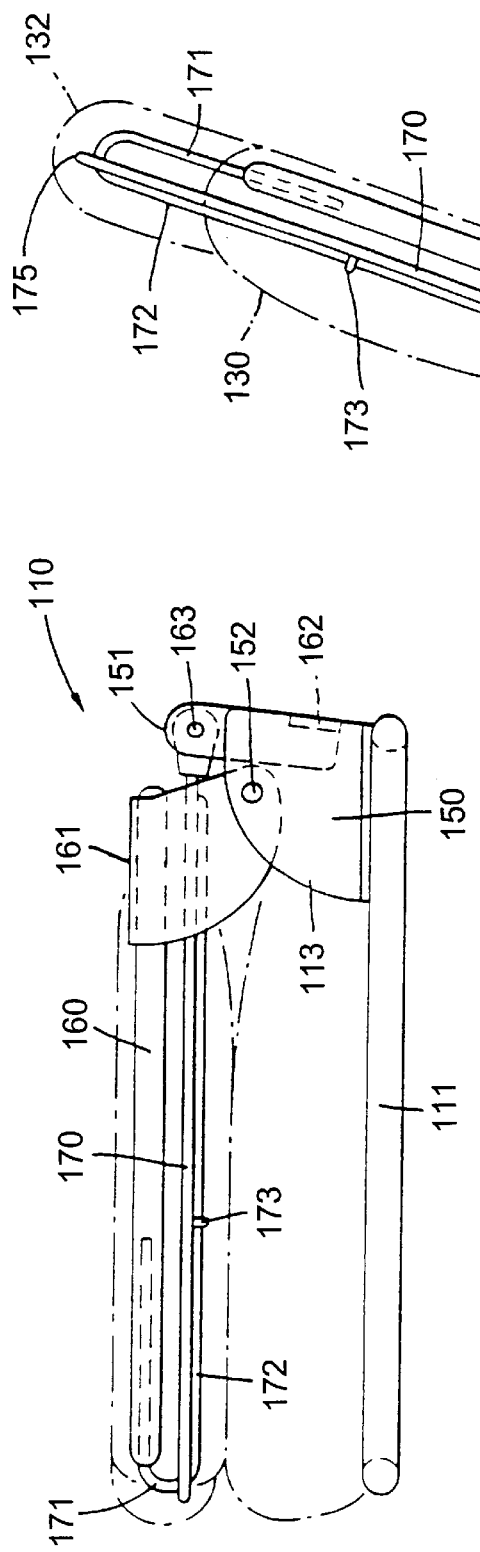
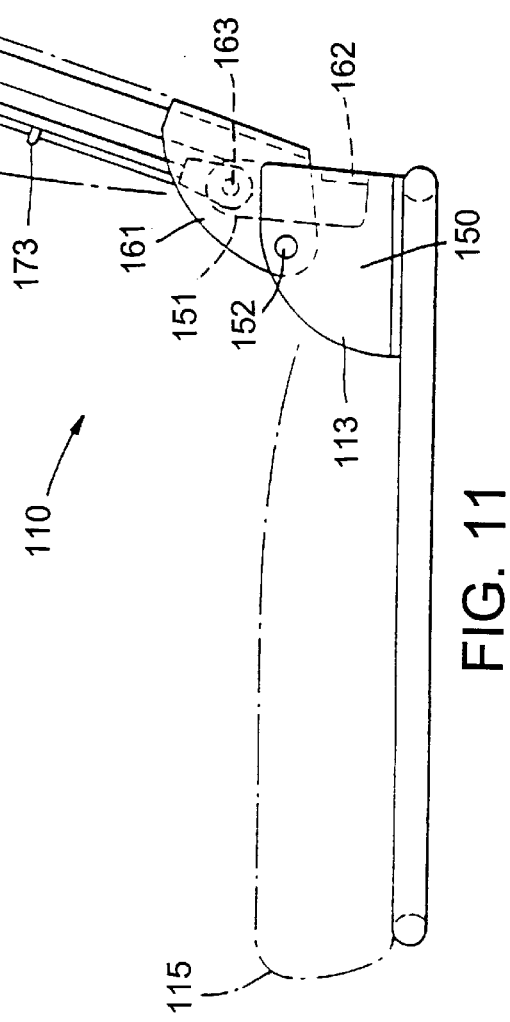
FIG. 11
FIG. 12

FOLDING SEATING UNIT FOR A VEHICLE

The present invention relates to vehicle seating, and in particular to "occasional" vehicle seating which is adapted to fold for compact stowage when not in use in order to create an increased load carrying area.

For example, many multipurpose or estate type vehicles have a third row of "occasional" seating situated behind the customary second row of seating. When not in use, this occasional seating may be designed to fold into the floor space, or against the sides of the vehicle in such a manner as to cause minimal encroachment upon the load carrying area.

There are various problems associated with the design of such seating. Folding of the seating into the vehicle floor usually creates a convenient flat load carrying area, but may not always be possible owing to spare wheel storage or fuel tank positioning. In many vehicles, therefore, the occasional seating must be stored at the sides of vehicle.

Typical prior art seating which is stored at the vehicle sides is often of a simple design; for example, a bench type seat which simply hinges down from the vehicle side on which an occupant sits sideways-facing. Whilst this is convenient, there is a preference for forward facing seating.

Typical prior art forward facing seating provides a seat base with a backrest which folds backwards to allow the seat base to be folded upwards and against the side of the vehicle, thereby obscuring parts of the rear and/or side windows. The stowage position of this seating is undesirable because it intrudes sideways into the load carrying area, and as indicated above, also obscures vision by occluding parts of the windows of the vehicle.

It is an object of the present invention to provide a vehicle seating unit which is capable of being stowed below the waistline (ie. window level) of the vehicle while not intruding into the normal load carrying area, and preferably which is quickly and easily moved between deployed and stowed positions.

It is a further object of the present invention to provide occasional seating which, when deployed in the vehicle, is capable of safely accommodating occupants in a forward or rearward facing position, and which preferably includes an integral backrest which provides adequate back, neck and head restraint for varying sizes of occupant.

According to one aspect, the present invention provides a folding seating unit for a vehicle comprising:

a seat base;

a back rest pivotally attached to the seat base and adapted to fold onto the seat base about a first axis; and a support for supporting the seat base in the vehicle and adapted to fold the seat base to a substantially vertical position against a side of the vehicle, about a second axis which is substantially orthogonal to the first axis.

According to a further aspect, the present invention provides a folding seating unit for a vehicle comprising:

a seat base;

a support for supporting the seat base in the vehicle; and a backrest pivotally attached to the seat base and adapted to pivot from a first, substantially upright, position to a second, stowed position generally parallel to the seat;

the support including:

an outboard leg, attached to the seat base and adapted for attachment to a side of the vehicle, having first pivot means for attachment to the seat base and second pivot means for attachment to the vehicle side, which first and second pivot means enable the seat base to fold from a first, stowed position substantially parallel to the side of the vehicle to a second, deployed position substantially parallel to the vehicle floor; and wherein the rotation of the seat base about the first pivot means and the rotation of the outboard leg about the second pivot means are in opposing directions during a folding operation.

According to a further aspect, the present invention provides a folding seating unit for a vehicle comprising:

a seat base;

a backrest pivotally attached to the seat base and adapted to pivot from a first position in which it is substantially upright to a second position in which it is folded onto the seat base, the back rest including:

a first frame supporting two side squabs extending longitudinally along the sides of the backrest;

a second frame, substantially parallel to the first frame and displaceable in relation thereto in a longitudinal direction, the second frame supporting a centre squab of the back rest extending longitudinally between the side squabs of the backrest and of substantially the same length as the side squabs, the second frame thereby adapted to extend the height of the centre region of the back rest when in an extended position, and adapted to at least partly retract into the first frame when in a retracted position.

The present invention will now be described by way of example and with reference to the accompanying drawings in which:

FIG. 6b shows a perspective view of the upholstery or squab profile of the seat of FIG. 6a;

FIGS. 7, 8 and 9 show schematic views illustrating the principles of the extending backrest of the present invention, in which FIG. 7 shows a perspective view of a seating unit in unfolded or deployed, condition; FIG. 8 shows a perspective view of the seating unit in folded condition; and FIG. 9 shows a side view of the seating unit indicating the retracting motion of the backrest;

FIG. 11 shows a detailed side view of the seating unit of FIG. 10 in a deployed condition; and FIG. 12 shows a detailed side view of the seating unit of FIG. 10 in a folded condition.

Figure 1:
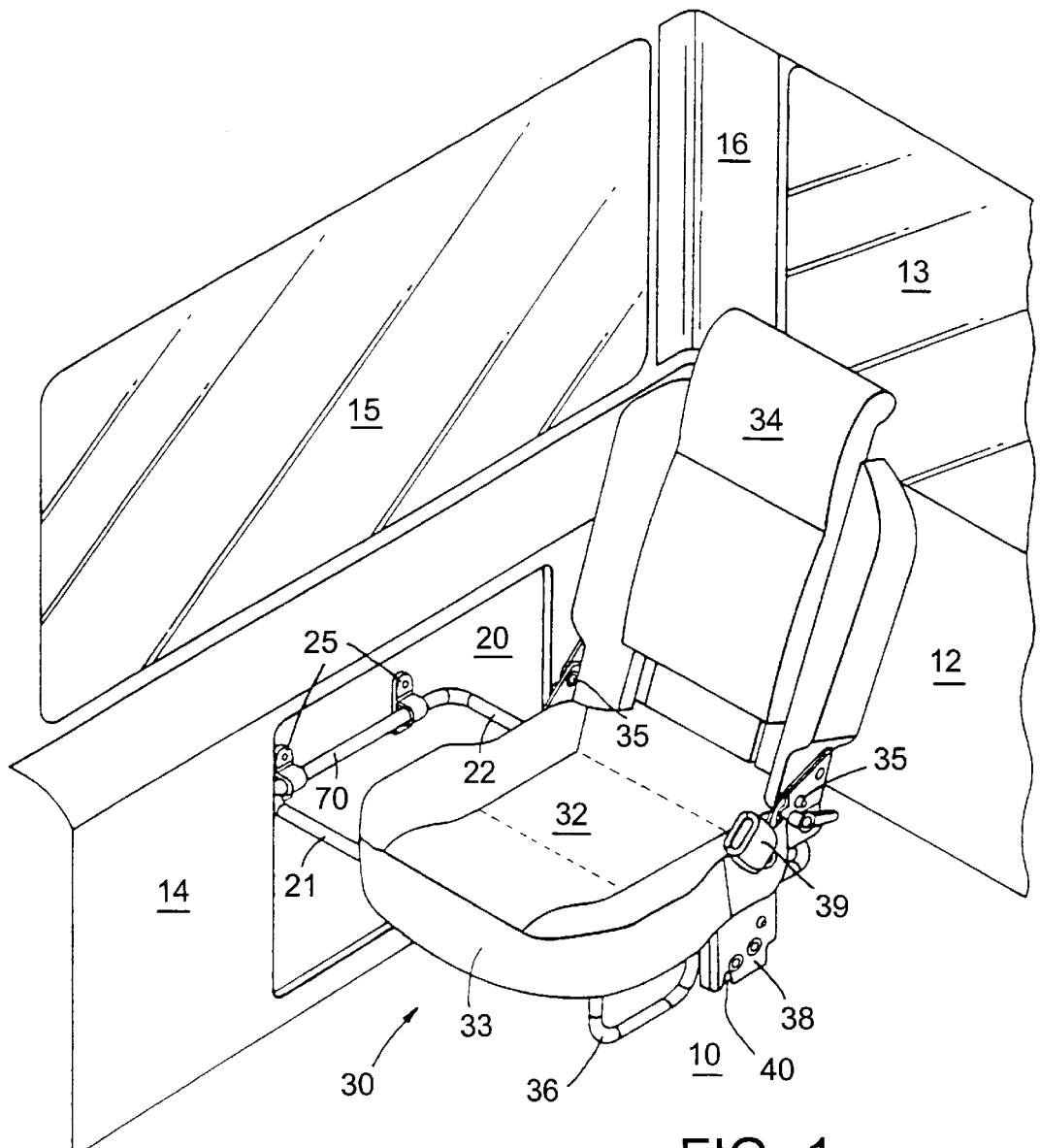
FIG. 1 shows a perspective view of a seating unit in accordance with the present invention, in deployed position, showing its relationship to a vehicle in which it is installed.

With reference to FIG. 1 there is shown the rear quarter of a multipurpose type vehicle or van having a load carrying area 10 bounded by a rear door 12 and side trim panels 14.

The lower edges of rear side window 15 and back window 13 define the "waistline" of the vehicle. As is customary in many vehicles, wheel arches, fuel filler pipes, rear screen washer pumps and tanks, emergency tool kits and the like may be concealed behind trim panels 14 which can also provide useful storage areas. Preferably, the trim panels 14 are designed so as not to intrude sideways into the vehicle beyond the extent of the rear door pillar 16.

An occasional seating unit 30 is adapted to stow within a recess, or cavity 20 which is formed behind the trim panels 14. The occasional seating unit 30 comprises a seat 32 and a backrest 34 which is adapted to fold forwards onto the seat 32 by way of pivots 35. The pivots 35 thereby define a first folding axis which is preferably parallel to a transverse axis of the vehicle.

The seating unit 30 is supported by an inboard leg 36 which preferably includes a floor engaging plate 38 which latches into a floor staple 40 or the like. The seating unit 30 is also supported by a pair of outboard legs 21,22 which are attached to the sides of the vehicle at suitable anchorage points 25.

Preferably, the seating unit 30 will include integrally mounted seat belt anchorage points 39 which may transmit the required seat belt loads through the seating unit frame to floor staple 40 and to the vehicle side anchorage points 25. Preferably, the seating unit 30 will also include a backrest latching mechanism to latch the backrest into both its upright (deployed) position, and its folded or stowed position.

Figure 6A:
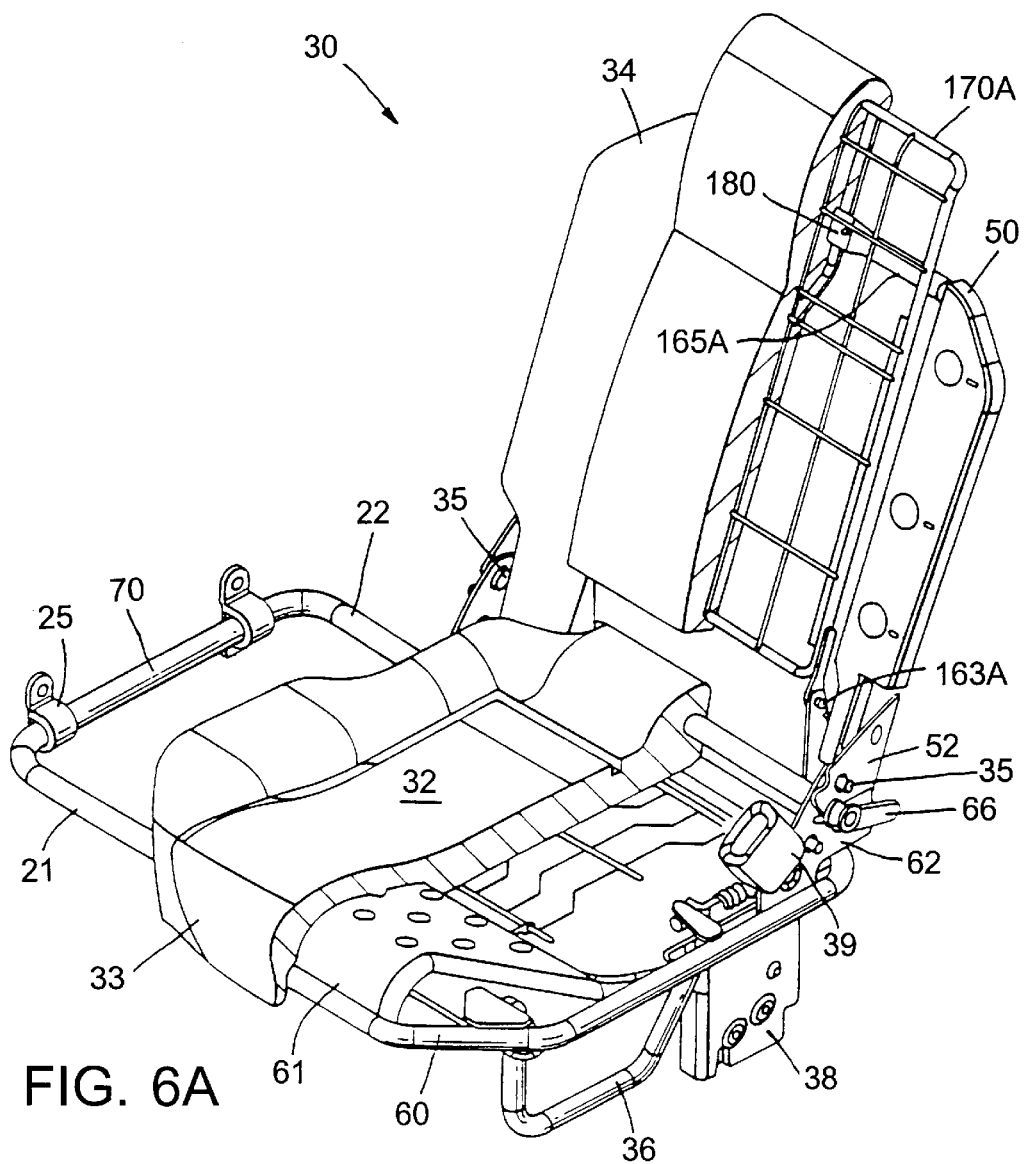
FIG. 6a shows a perspective view of the presently preferred seating unit according to the present invention, with partial cut away of upholstery to reveal detail of the seat frame.
Figure 6B:
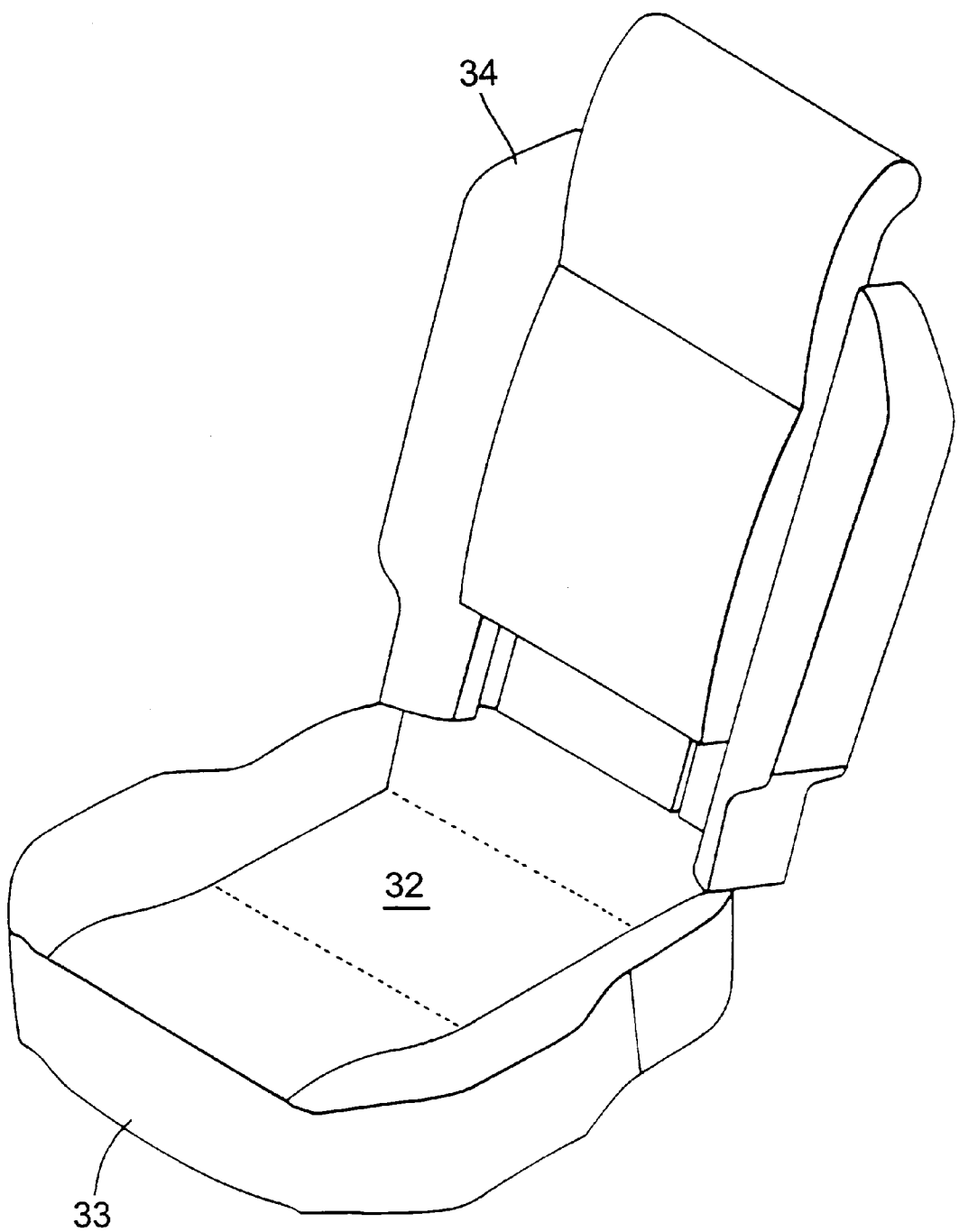

The seating unit 30 is also illustrated in greater detail in FIGS. 6a and 6b, with FIG. 6b showing a presently preferred profile of the upholstery or squabs which is partly omitted on FIG. 6a. FIG. 6a also shows features of an extending backrest which will be referred to later.

The folding mechanism of the seating unit 30 will now be described in greater detail with reference to FIGS. 2 to 5. In these Figures, the upholstery of the seating unit is shown in dotted outline to reveal the detail of the folding mechanism, and details of the backrest are omitted for clarity.

Figure 2:
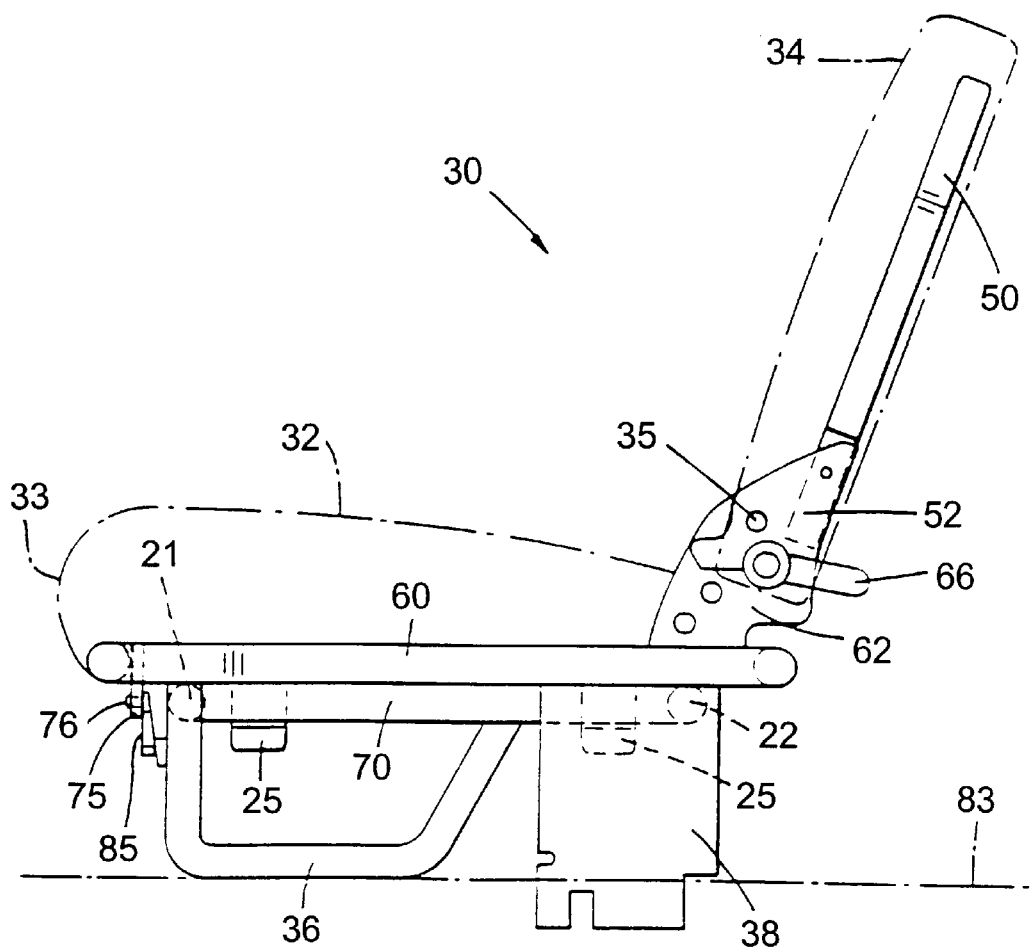
FIG. 2 shows a side view of the seating unit of FIG. 1, in deployed position, simplified to show detail of the folding mechanism.
Figure 3:
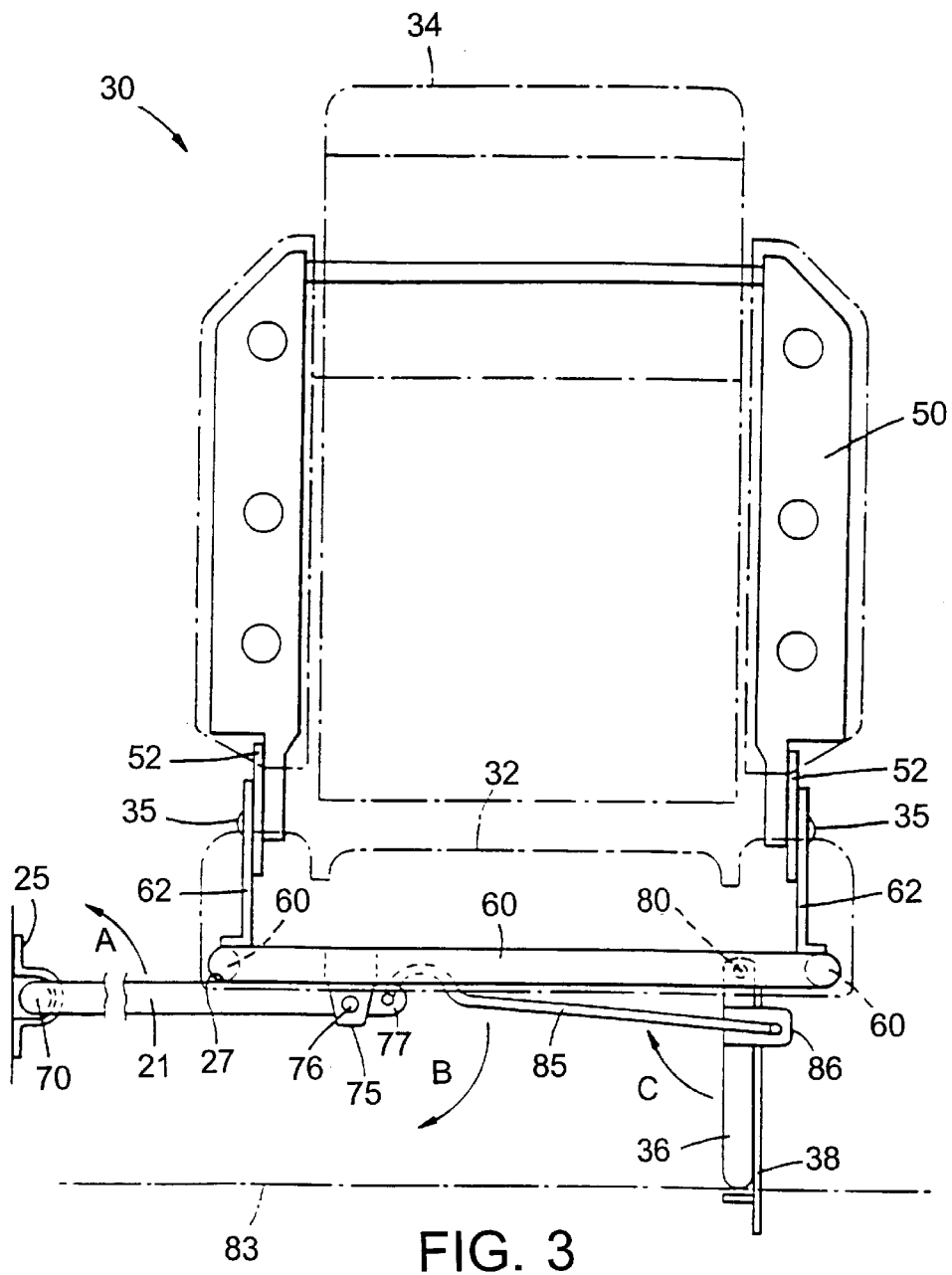
FIG. 3 shows a front view of the seating unit of FIG. 1, also in deployed position and simplified to show detail of the folding mechanism.

FIGS. 2 and 3 show the seating unit 30 in deployed position with the backrest 34 upright, ie. the normal seating position. The backrest 34 comprises a backrest frame 50 which extends upwards on each side of the seating unit from bracket members 52. The backrest frame may support a plurality of wires (not shown) which are stretched across it to support a backrest squab in known manner. The backrest frame 50 may also include an extending backrest squab as described later with reference to FIGS. 7 to 12.

The seat 32 comprises a seat frame 60 having an approximately square or rectangular perimeter which supports a seat cushion or squab as shown in dotted outline, and to which are connected backrest support plates 62. The support plates 62 are coupled to the bracket members 52 by the pivots 35.

The outboard legs 21,22 are formed as part of a U-shaped frame member comprising a base portion 70 which extends along the vehicle side through anchorage points 25. The base portion is free to pivot about its longitudinal axis. The outboard legs 21,22 respectively extend from opposite ends of base portion 70 from the vehicle side to the seat frame 60, to which they are coupled by corresponding lugs 75 and pivots 76. The outboard legs 21,22 are thus hinged at both ends: to the seat 32 by a first pivot means which, in the preferred embodiment, comprises the pivots 76; and to the vehicle side by a second pivot means which, in the preferred embodiment, comprises the base member 70 and the anchorage points 25. The outboard legs 21,22 have an upper surface 27 which bears upon the lower surface of the seat frame 60 outboard of the pivots 76 when the seating unit is in the deployed position of FIG. 3. This provides a stop means which limits the extent of rotation of the seat 32 about pivots 76.

The inboard leg 36 is formed from a generally U-shaped frame which is attached to the seat frame 60 by a third pivot means which, in the preferred embodiment comprise pivots 80. The pivots 80 enable the inboard leg 36 to be folded substantially parallel and coplanar with the seat frame 60.

At least one of the outboard legs (shown as the forward outboard leg 21) includes an extension portion 77 which extends past the lug 75 and pivot 76 and to which is connected a link member 85 pivotally coupled to an offset lug 86 on the inboard leg 36.

Figure 4:
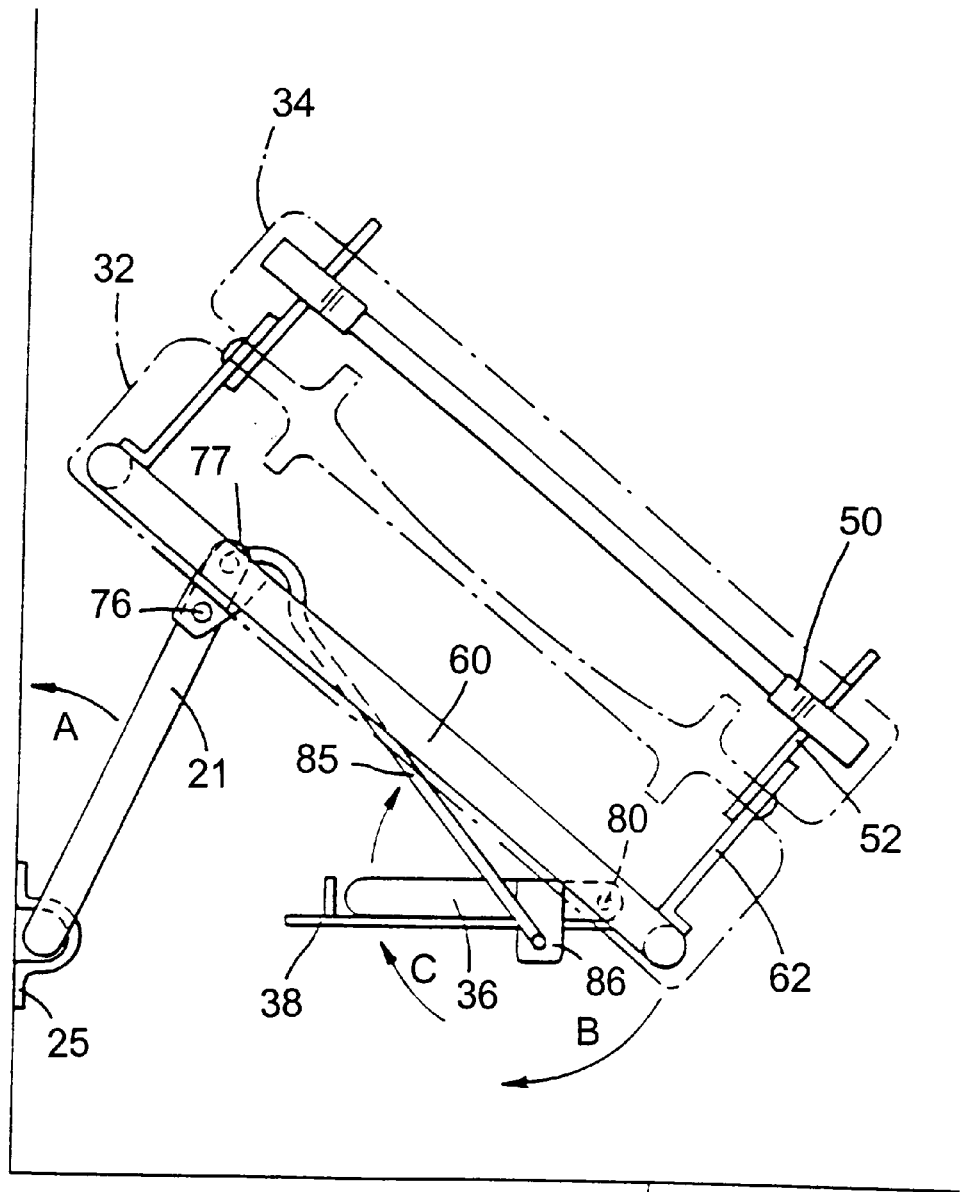
FIG. 4 shows a front view of the seating unit of FIG. 3, but with backrest folded forward, and the seating unit moved part way to its stowed position.
Figure 5:
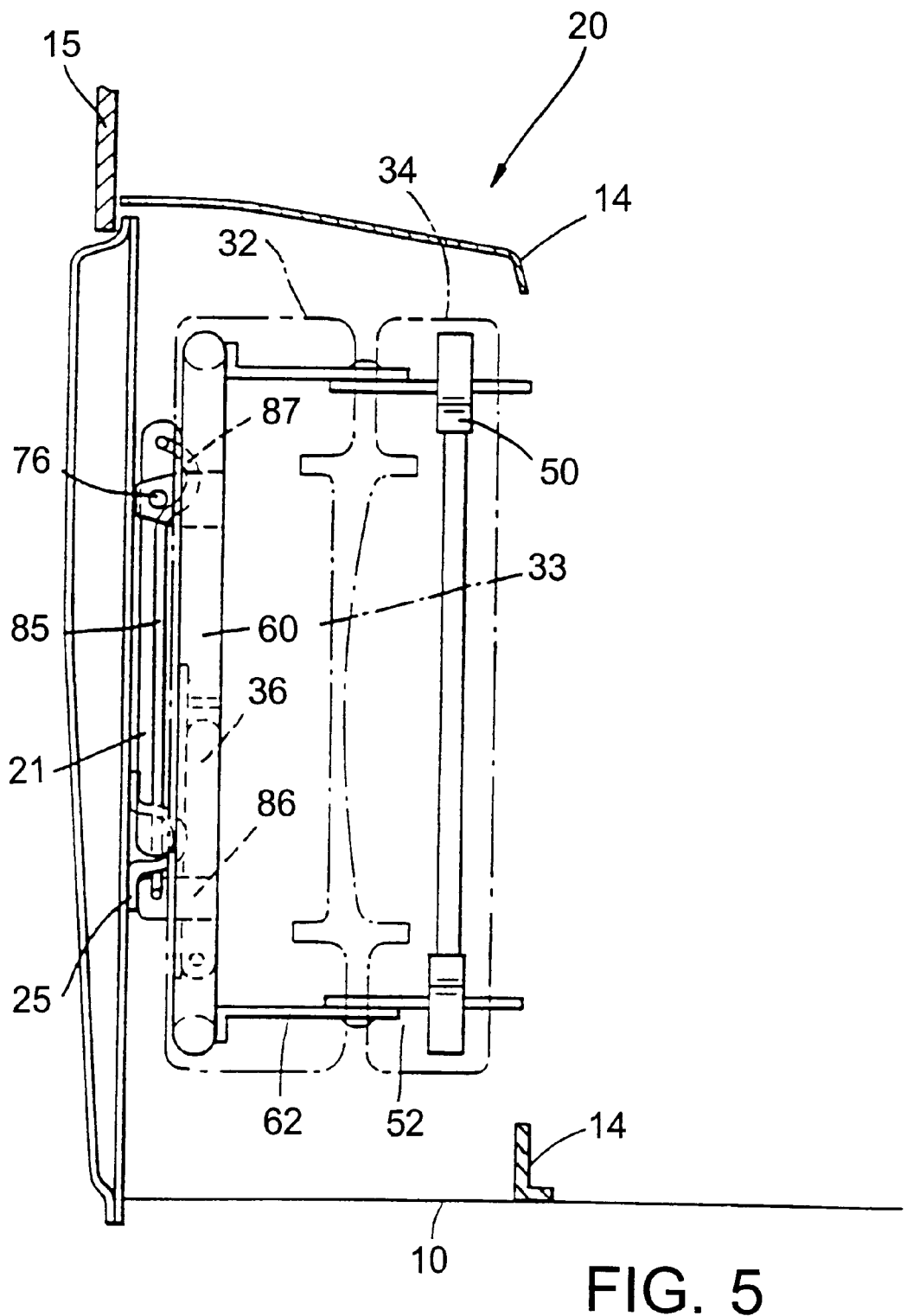
FIG. 5 shows a front view of the seating unit of FIG. 3 in fully stowed position.

With reference to FIGS. 3, 4 and 5, the folding action of the seating unit from its deployed position to its stowed position will now be described. When the seating unit is to be folded, the backrest 34 is folded forwards from its upright position (FIGS. 2 and 3) to its stowed position substantially parallel to the seat 32 (FIG. 4). The floor engaging plate 38 is then released from the floor 83, and the outboard side of the seat 32 is lifted causing outboard legs 21,22 to rotate about anchorage points 25 as indicated by arrow A (FIGS. 3 and 4). Seat frame 60 simultaneously rotates about pivots 76 in the direction indicated by arrow B. The extension portion 77 of outboard leg 21 provides a pulling action on inboard leg 36 via link member 85 causing inboard leg 36 to fold upwards and inwards to the seat frame 60 as indicated by arrow C.

Thus, during a folding operation, the rotation of the seat 32 about the first pivot means, and the rotation of the outboard legs 21,22 about the second pivot means are in opposing directions, and the rotation of the inboard leg 36 about the third pivot means is in the same direction as the rotation of the seat about the first pivot means. The pivots 76 thereby define a second folding axis which is preferably parallel to the longitudinal axis of the vehicle, and substantially orthogonal to the first folding axis.

With reference to FIG. 5, the seating unit is shown in fully stowed position. The offset lug 86 enables the inboard leg 36 to fold completely coplanar with the seat frame 60, while the link member 85 lies parallel with the outboard leg 36. A crook 87 in the link member 85 allows the link member to pass over pivot 76 if necessary.

The unfolding of the seating unit to its deployed position follows a procedure which is the reverse of the folding action described above, mutatis mutandis.

In a modification (not shown) the seat frame 60 incorporates a hook which engages one of the outboard legs 21, 22 when the seating unit is in the deployed position and which is released with the floor engaging plate.

It will be understood that by modifying: the length of the outboard legs 21,22; the lateral displacement of the pivot 76 from the edge of the seating unit 30; and the height of the anchorage points 25 from the vehicle floor it is possible to obtain different geometries of seating unit, for example which vary height of the seat 32 both when deployed and when stowed, and to vary the distance of the seating unit 30 from the vehicle side.

The positioning of the anchorage points 25, the length of the outboard legs 21,22 in relation to the width of the seat and the positioning of the pivot 76 enable the seat to be folded sideways into an aperture in the trim panels 14 which has a height substantially equal to the width of the seat and which is below the waistline of the vehicle, as depicted in FIG. 5. This is achieved without requiring detachment of the seat from the vehicle.

The recess 20 in the side trim panels 14 may be open at the top which allows a lower window line in the vehicle without the stowed seating unit causing obstruction.

It will be understood that although the illustrative embodiments described above all relate to a seating unit deployed from the right hand side of the vehicle, left hand versions may be constructed by appropriate reversal of relevant components without difficulty.

It will also be understood that similar considerations apply in the reversal of seating units from forward to rearward facing configurations.

It will also be understood that the seating unit may include a pneumatic, hydraulic or other power assisted deployment mechanism to assist the user in deployment and/or stowage of the seating unit.

For compact stowage of the seating unit, it is desirable that the backrest 34 is of limited height such that the backrest (or squab thereof), when folded flat onto the seat base 32 (or squab thereof), does not extend substantially beyond the leading edge 33 of the seat 32. In conflict with this requirement is the consideration that if the backrest height is reduced too far, inadequate support for the upper back, neck and/or head of the occupant will result, and this can be particularly dangerous in vehicle collisions in which whiplash injuries may be sustained by the occupant of such seating.

To overcome this problem, the seating unit preferably includes an extending backrest which enables the seating unit to accommodate all adult persons within normal variations in height, maintaining adequate support for the upper back and neck of the occupant, while enabling compact stowage of the seating unit.

Figure 7:
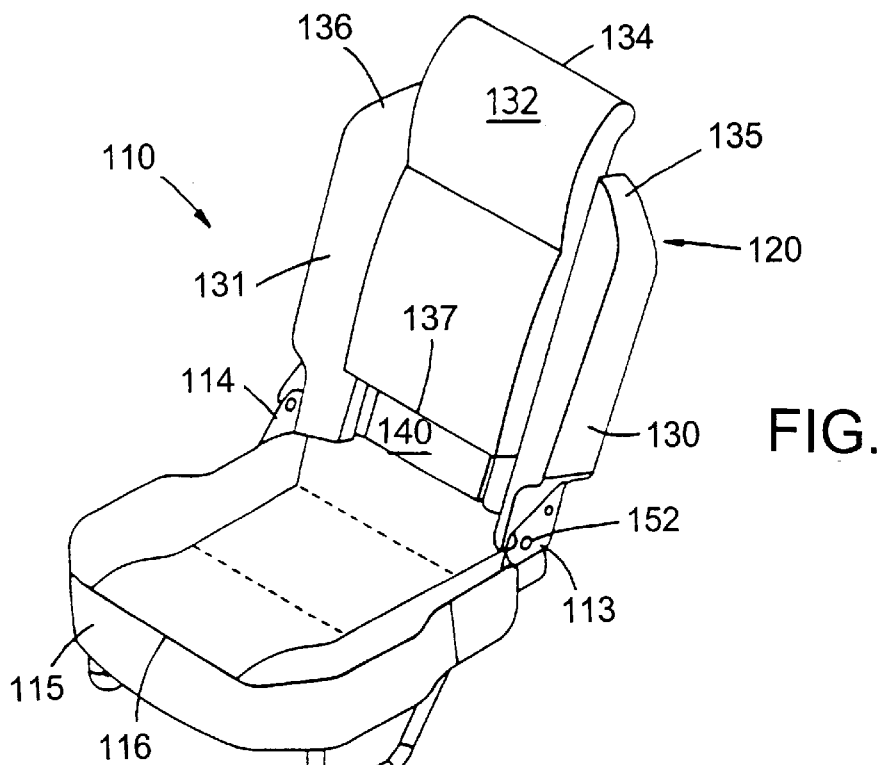
Figure 8:
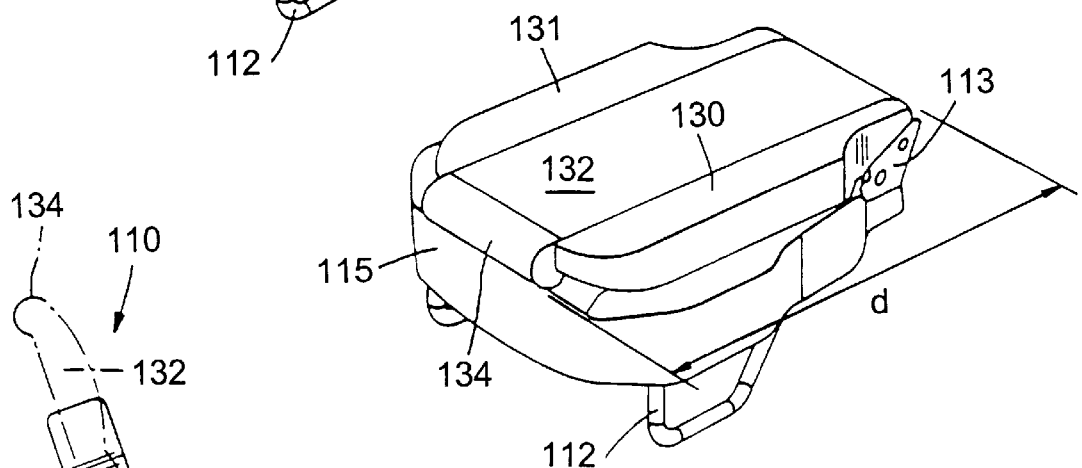
Figure 9:
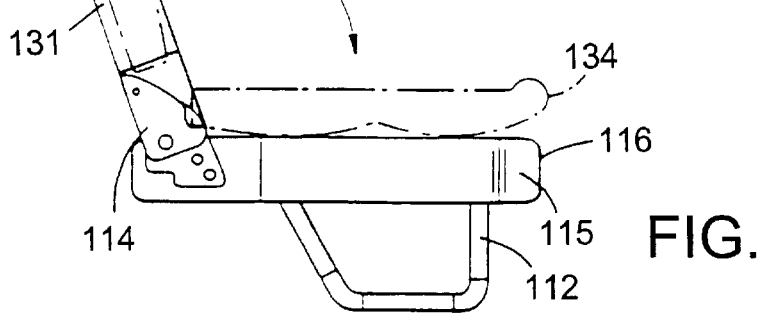

With reference to FIGS. 7 to 9, the principles of operation of an extending backrest are shown. FIGS. 7 and 8 show a seating unit 110 which is shown in deployed or unfolded condition (FIG. 7) and in folded condition (FIG. 8). The seating unit 110 comprises a leg assembly 112 (which may also be similar to the folding leg assembly described supra), a seat 115 coupled to the leg assembly and side brackets 113,114 coupled to the seat 115.

A backrest 120 is attached to the side brackets 113,114 by pivots 152. The backrest 120 comprises two portions: an outer frame which supports two side squabs 130,131 and an inner frame which supports a centre squab 132. The inner frame and centre squab 132 are mounted in substantially the same, or substantially parallel planes by way of a mechanism which permits the inner frame to be moved longitudinally in relation to the outer frame. This enables the inner frame and centre squab 132 to rise within the outer frame so that the upper edge 134 of centre squab 132 extends above the upper edges 135,136 of side squabs 130,131. This effectively increases the height of the backrest in the critical region of the head, neck and shoulders of the occupant, where protection against whiplash injuries is most important.

However, when folded, the inner frame and centre squab 132 are retracted into the outer frame and side squabs 130,131 in order that upper edge 134 of centre squab 132 lies substantially in line with the upper edges of side squabs 130,131. This has the desirable effect of reducing the folded depth d of the seating unit 110 so that the upper edge 134 approximately overlies the forward or leading edge 116 of seat squab 115, as clearly shown in FIG. 9.

In the deployed condition (FIG. 7), the rising centre squab 132 may cause a small gap 140 to form between the back of the seat squab 115 and the lower edge 137 of the centre squab 32. When kept to reasonable proportions (eg. 10–15 cm), this gap does not significantly affect the support offered by the seat to the occupant. Preferably, a fabric cover is provided which stretches or unfolds across the gap 140 between the upholstered portion of seat 115 and centre squab 132. Alternatively, an upholstered panel could be provided behind the centre squab in the region of gap 140.

In the preferred embodiment, as particularly shown in FIG. 6a, the leg assembly also folds to enable compact stowage of the seating unit.

Figure 10:
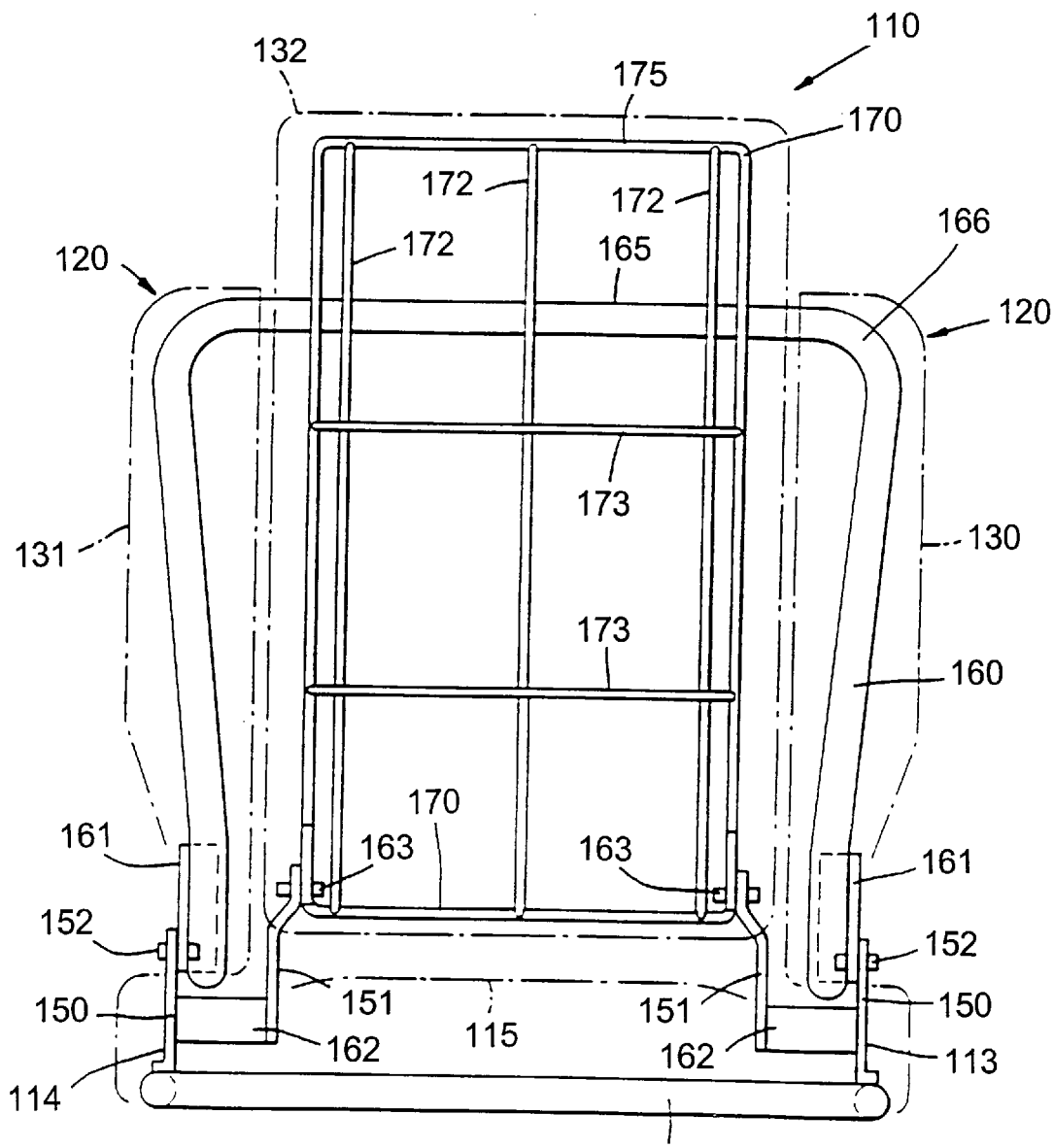
FIG. 10 shows a front view of a seating unit according to the present invention without backrest upholstery and in deployed condition, showing detail of the backrest.

With reference now to FIGS. 10 and 11, the detailed structure of the backrest of the preferred embodiment of seating unit 110 will be described. Details of the leg assembly have been omitted from FIGS. 10 to 12 for clarity. Upholstered parts of the seating unit are shown in dotted outline only to reveal the internal structure of the seating unit.

The seating unit 110 comprises a leg assembly (for example, that previously described) coupled to the seat frame 111 defining a substantially rectangular or square perimeter in the horizontal plane as shown. The seat frame 111 is constructed in accordance with normal seating design, to include a support for a sprung or foam cushion seat squab 115, and may incorporate other known features such as an antisubmarining pan (eg. 61 in FIG. 6a) and the like.

Extending upwardly from seat frame 111 are two side brackets 113, 114 which may be affixed to seat frame 111 by welding, brazing or other suitable method. Each side bracket 113,114 includes an outer and an inner stem 150, 151 respectively. Outer stem 150 extends upwardly to a pivot 152 which is used to couple the outer frame 160 of a backrest 120 to the side bracket 113,114 via a bracket 161.

Each side bracket 113,114 includes an inwardly extending arm 162 to which is connected the inner stem 151 which extends upwardly therefrom. The inner stem 151 terminates in a pivot 163 upon which is mounted an inner frame 170. In a preferred embodiment, bracket 113 comprises outer stem 150, inwardly extending arm 162 and inner stem 151 formed from a single piece of sheet metal with a 90° bend between each part.

The inner frame 170 is also coupled to the outer frame by way of one or more sliding connecting members 171 (FIG. 11) which engage with the upper bar 165 of outer frame 160. Sliding connecting members 171 extend downwardly from an upper edge 175 of inner frame 170 to pass through the upper bar 165 of outer frame 160.

It will be understood that this sliding connection may be achieved in a number of ways. For example, inner frame 170 may include both horizontally and vertically extending support members 173,172, the vertically extending members 172 passing through or around the upper bar 175 of inner frame 170 to the rear thereof where they then extend in a downward direction as connecting members 171 (see FIG. 11).

As seen in FIGS. 10 and 11, with the seating unit 110 in deployed condition, the inner frame 170, and thereby centre squab 132, are longitudinally displaced in an upward direction with reference to the outer frame, and thereby side squabs 130,131.

When the seating unit 110 is folded to the position shown in FIG. 12, the inner frame 170, and thereby centre squab 132 are retracted to lie substantially within the outer frame 160 by the action of the two pairs of pivots 152,163. Because the outer frame pivot 152 is positioned both forward of and below the inner frame pivot 163, the retraction of inner frame 170 is effected automatically upon folding the backrest 120 into the folded position of FIG. 12.

Where it is desirable to have integrally mounted seatbelts, it is possible to use the shoulder 166 of the outer frame 160 as the upper anchorage point of a three-point harness, the lower anchorage points of the harness being coupled to the seat frame 111 in known manner. In this configuration, the inner frame 170 does not carry the seat belt loadings.

In other embodiments, the dual pivot pairs 152,163 which provide automatic longitudinal displacement of the inner frame with respect to the outer frame may be replaced with a simpler mechanism by which the inner frame may be manually pulled into the extended or retracted positions.

FIGS. 6a and 6b show the features described with reference to FIGS. 1 to 5 and 7 to 12 combined in a preferred embodiment of a seating unit according to the invention, parts corresponding to those in FIGS. 1 to 5 having the same reference numerals and parts corresponding to those in FIGS. 7 to 12 having the same reference numerals but with a suffix A. The backrest 34 incorporates a latch mechanism (not shown) operated by a lever 66 to lock the backrest in the upright or deployed position. The inner frame 170A is guided on the backrest frame 50 by means of a bearing 180 carried on the upper bar 165A and a slider 171A carried by the inner frame. The inner frame 170A is pivoted at 163A on stems 151A formed as part of the side brackets 52 (see brackets 113, 114 in FIG. 10).

The inner frame may be used to mount an adjustable head restraint which moves in concert with the inner frame, or a separate head restraint may be provided by other means. The embodiments of seating herein described have particular utility in the application of a third row of seating in a vehicle in which head restraints for the occupants of the third row of seating are incorporated into the trim of the back door of the vehicle. The rising centre squab then serves to fill in a gap caused by a height differential between the upper edge of the backrest and the lower edge of the head restraints on the back door of the vehicle. While the head restraints are correctly set at a height appropriate for average sized adult occupants of the occasional seating, it is clear that smaller persons would not be provided with adequate head protection without the rising centre squab arrangement.

We claim:

1. A folding seating unit for a vehicle comprising:

a seat base;

a backrest pivotally attached to the seat base and adapted to fold onto the seat base about a first axis substantially parallel to a transverse axis of the vehicle;

a support for supporting the seat base in the vehicle and adapted to enable folding of the seat base to a substantially vertical position against a side of the vehicle, about a second axis which is substantially orthogonal to the first axis and which is substantially parallel to a longitudinal axis of the vehicle;

the backrest being coupled about the first axis to be extensible therefrom, and is adapted so that it does not extend substantially beyond a leading edge of the seat base when the backrest is folded onto the seat base; and the folding seating unit being adapted to fold into a recess in the side of the vehicle so as to lie flush with a side trim of an interior of the vehicle.

2. A folding seating unit according to claim 1 in which the recess lies entirely below a waistline of the vehicle.

3. A folding seating unit according to claim 1 in which the support includes an outboard leg, attached to the seat base and adapted for attachment to the side of the vehicle, having first pivot means for attachment to the seat base and second pivot means for attachment to the vehicle side, which first and second pivot means enable the seat base to fold from a first, stowed position substantially parallel to the side of the vehicle to a second, deployed position substantially parallel to a floor of the vehicle; and wherein rotation of the seat base about the first pivot means and the rotation of the outboard leg about the second pivot means are in opposing directions during a folding operation.

4. A folding seating unit according to claim 3 and further including:

an inboard leg coupled to the seat by a third pivot means, which third pivot means enables the inboard leg to pivot from a first, folded position substantially parallel to the seat to a second, unfolded position extending in a generally downward direction from the seat.

5. A folding seating unit for a vehicle comprising:

a seat base;

a support for supporting the seat base in the vehicle; and a backrest pivotally attached to the seat base and adapted to pivot from a first, substantially upright, position to a second, stowed position generally parallel to the seat;

the support including:

an outboard leg, attached to the seat base and adapted for attachment to a side of the vehicle, having first pivot means for attachment to the seat base and second pivot means for attachment to the vehicle side, which first and second pivot means enable the seat base to fold from a first, stowed position substantially parallel to the side of the vehicle to a second, deployed position substantially parallel to a floor of the vehicle, wherein rotation of the seat base about the first pivot means and rotation of the outboard leg about the second pivot means are in opposing directions during a folding operation; and an inboard leg coupled to the seat by a third pivot means, which third pivot means enables the inboard leg to pivot from a first, folded position substantially parallel to the seat to a second, unfolded position extending in a generally downward direction from the seat.

6. A folding seating unit according to claim 5 further including stop means limiting the extent of rotation of the seat base about the first pivot means which stop means comprises mutually abutting surfaces of the seat base and the outboard leg which are outboard of the first pivot means.

7. A folding seating unit according to claim 5 wherein the inboard leg rotates about the third pivot means in the same direction as the rotation of the seat about the first pivot means during the folding operation.

8. A folding seating unit according to claim 7 further including:

a link member coupling the inboard leg to the outboard leg and adapted to drive the inboard leg from its first, folded position to its second, unfolded position when the seat is folded from its first, stowed position to its second, deployed position.

9. A folding seating unit according to claim 8 wherein the link member is driven by an extension portion of the outboard leg.

10. A folding seating unit according to claim 1 and further including floor-engaging means coupled to the inboard leg for releasably locking the inboard leg to the vehicle floor.

11. A folding seating unit according to claim 5 and further including floor-engaging means coupled to the inboard leg for releasably locking the inboard leg to the vehicle floor.

12. A folding seating unit according to claim 1, the seat base including a seat squab, the backrest having a centre squab and at least one side squab of substantially similar lengths, including connecting means adapted to automatically move the centre squab longitudinally in relation to the at least one side squab when the backrest is pivoted to an upright position, thereby to provide a raised central portion of the backrest, and adapted to automatically return the centre squab to its original position when the backrest is folded down toward the seat squab.

13. A folding seating unit according to claim 5, the seat base including a seat squab, the backrest having a centre squab and at least one side squab of substantially similar lengths, including connecting means adapted to automatically move the centre squab longitudinally in relation to the at least one side squab when the backrest is pivoted to an upright position, thereby to provide a raised central portion of the backrest, and adapted to automatically return the centre squab to its original position when the backrest is folded down toward the seat squab.

14. A folding seating unit according to claim 12 in which the backrest includes a first frame supporting two of said side squabs extending longitudinally along the sides of the backrest and a second frame supporting the centre squab which extends longitudinally between the side squab and is of substantially the same length as the side squab.

15. A folding seating unit for a vehicle comprising:

a seat base;

a backrest pivotally attached to the seat base and adapted to pivot from a first position in which it is substantially upright to a second position in which it is folded onto the seat base, the back rest including:

a first frame supporting two side squabs extending longitudinally along sides of the backrest;

a second frame, substantially parallel to the first frame and displaceable in relation thereto in a longitudinal direction, the second frame supporting a centre squab of the back rest which extends longitudinally between the side squabs of the backrest and is of substantially the same length as the side squabs, the second frame thereby adapted to extend to a height of the centre region of the back rest when in an extended position, and adapted to at least partly retract into the first frame when in a retracted position, and connecting means adapted to automatically displace the second frame from its retracted position to its extended position when the backrest is pivoted to its upright position, and to automatically displace the second frame from its extended position to its retracted position when the back rest is pivoted to its folded position.

16. A folding seating unit according to claim 15 in which the connecting means comprises first pivot means coupling the first frame to the seat base and second pivot means coupling the second frame to the seat base, the first and second pivot means being substantially parallel and displaced from one another such that the first axis is forward of and below the second axis.

17. A vehicle incorporating a folding seating unit according to claim 1.

* * * * *

UNITED STATES PATENT AND TRADEMARK OFFICE
CERTIFICATE OF CORRECTION

PATENT NO. : 5,984,397
DATED : November 16, 1999
INVENTOR(S) : David J. Walker, Matthew R. Oliver, Richard Dawson, Danella L. Bagnall and Christopher J. Goodall It is certified that error appears in the above-identified patent and that said Letters Patent is hereby corrected as shown below:

Title page,
Item [73] Assignees, replace "Tricom Automotive Limited" with -- Magna Seating Systems Limited --.

Signed and Sealed this

Second Day of October, 2001

Attest:

*Nicholas P. Godici*

NICHOLAS P. GODICI
*Attesting Officer*   *Acting Director of the United States Patent and Trademark Office*